Sept. 23, 1924.                                                        1,509,535
                         A. L. WERTZ
                APPARATUS FOR DISPENSING FLUIDS
                  Filed July 8, 1921        2 Sheets-Sheet 2
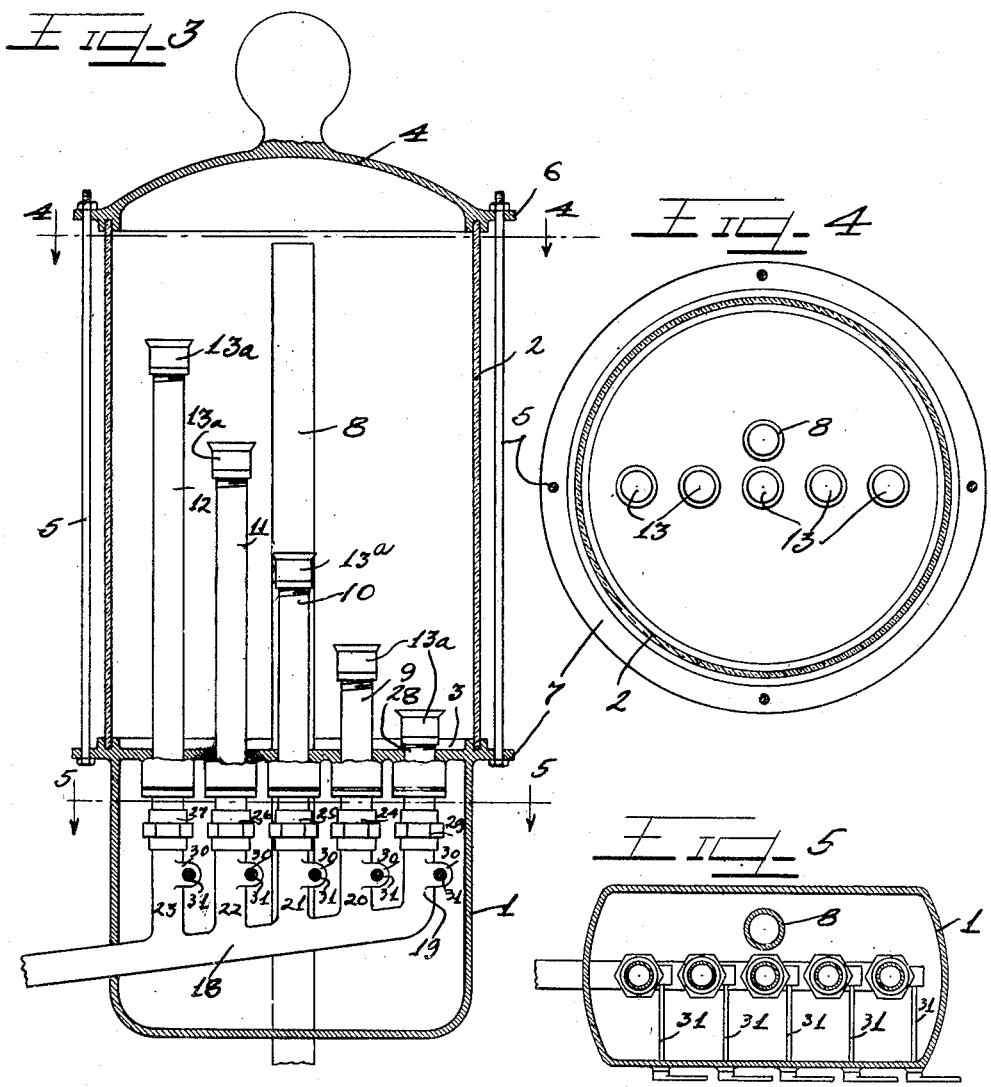

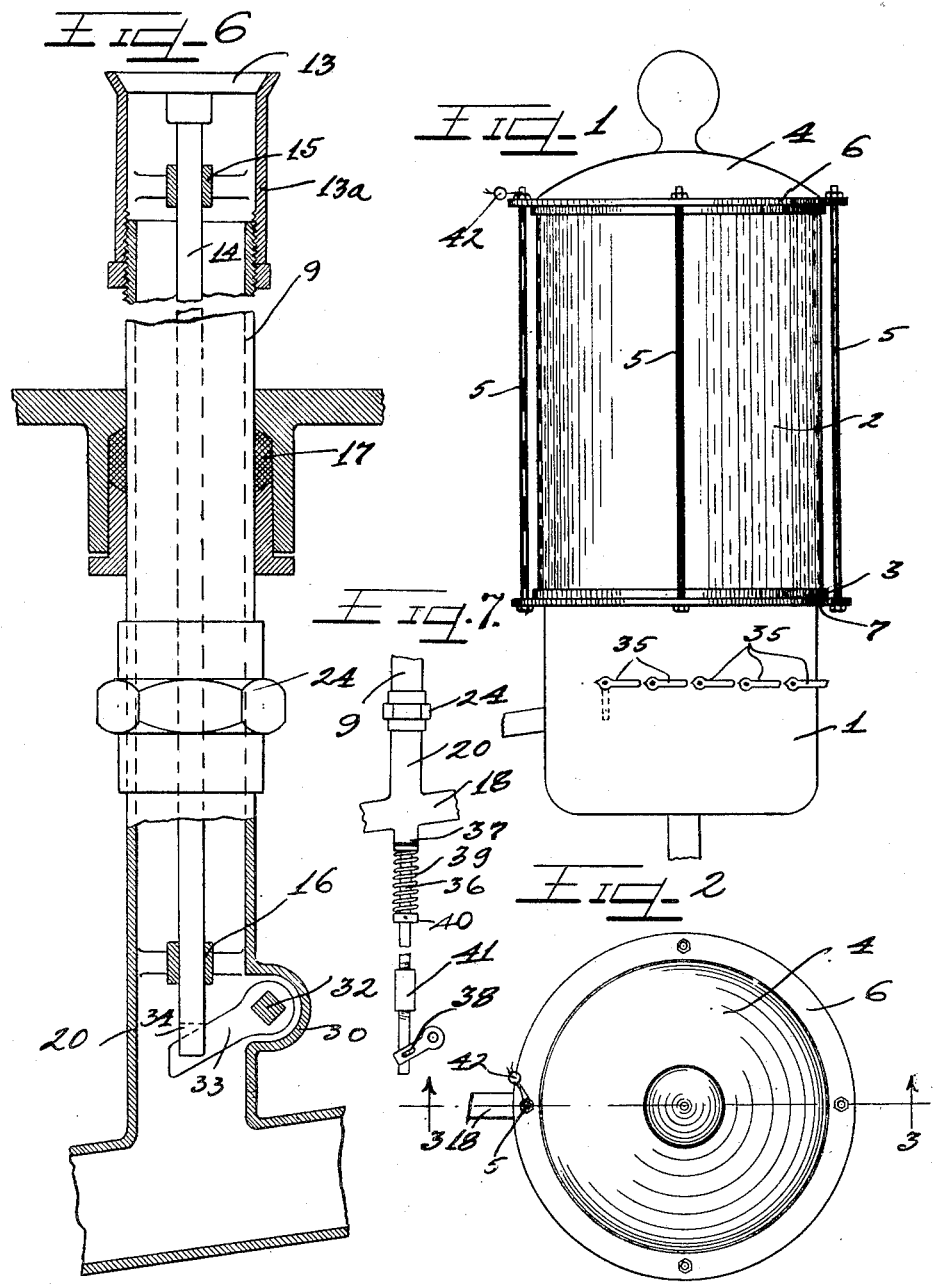

Patented Sept. 23, 1924.

1,509,535

UNITED STATES PATENT OFFICE.

AUSTIN L. WERTZ, OF DUBUQUE, IOWA.

APPARATUS FOR DISPENSING FLUIDS.

Application filed July 8, 1921. Serial No. 483,164.

*To all whom it may concern:*

Be it known that I, AUSTIN L. WERTZ, a citizen of the United States, and a resident of the city of Dubuque, in the county of Dubuque and State of Iowa, have invented certain new and useful Improvements in an Apparatus for Dispensing Fluids; and I do hereby declare that the following is a full, clear, and exact description of the same, reference being had to the accompanying drawings, and to the numerals of reference marked thereon, which form a part of this specification.

This invention relates to an apparatus for dispensing fluids, and particularly to an apparatus which is adapted to be used to selectively deliver accurately measured quantities of liquid fluids or lubricants.

In apparatus of this type as heretofore used, it has been necessary when delivering a smaller amount of liquid than the capacity of the dispensing container to ascertain the amount delivered from a sight gauge or float or by observing the level and to operate a valve to shut off the flow at the proper time. This procedure is at best inaccurate and is often wasteful for the reason that the operator will allow more than the required amount of liquid to be delivered in order to satisfy the customer that he is getting the proper measure. Constant attention from the operator is also required and the amount of work accomplished per operator is consequently lessened.

It is an object, therefore, of the present invention to provide a dispensing apparatus whereby an accurately measured volume of fluid may be delivered by opening the control valve.

It is another object of this invention to provide a dispensing apparatus wherein the opening of one of a plurality of control valves permits the delivery of an accurately measured volume of liquid.

It is a further object of this invention to provide a dispensing apparatus wherein a plurality of valve controlled stand pipes are adapted to selectively deliver measured volumes of liquid from an elevated container.

It is also an object of this invention to provide a dispensing apparatus wherein fluid outlets may be adjusted to deliver an accurately measured volume of fluid, said apparatus being adapted to be seated after the outlets are adjusted.

It is an important object of this invention to provide an accurate, simple, and easily operable apparatus for selectively delivering measured volumes of fluid.

Other and further important objects of this invention will be apparent from the disclosures in the drawings and specification.

The invention (in a preferred form) is illustrated in the drawings and hereinafter more fully described.

On the drawings:

Figure 1 is a side elevation of the dispensing apparatus embodying the principles of this invention.

Figure 2 is a top plan view thereof.

Figure 3 is an enlarged section on the line 3—3 of Figure 2 with parts in elevation.

Figure 4 is a section on the line 4—4 of Figure 3.

Figure 5 is a section on the line 5—5 of Figure 3.

Figure 6 is an enlarged fragmentary detail section of one of the stand pipes with parts shown in elevation.

Figure 7 is a side elevation of an extension valve operating mechanism.

As shown on the drawings:

The dispensing apparatus of this invention is particularly adapted to be used in connection with the sale or distribution of fuel oils, such as gasoline, and the liquid to be distributed is ordinarily first pumped into an elevated container which is supported on a base casing 1, and which comprises a transparent cylinder 2 of glass or other suitable material resting in a channelled flange 3 on said base casing and a domed cover 4 which is channelled to engage the upper edge of the cylinder 2. Said cover 4 is secured to the cylinder 2 and to the plate 3 by means of rods 5 which connect a flange 6 on the cover 4 with a flange 7 on the plate 3 on the base casing 1. Extending upwardly into the interior of the cylinder 2 to a point near the top thereof is a feed pipe 8 which leads outwardly through the base casing 1 to a supply tank or other source of fluid, and the fluid is forced from said supply tank through said supply pipe 8 into the interior of the cylinder until the entire cylinder is filled, at which time the means for forcing the fluid is disconnected, and the excess fluid in the cylinder is allowed to drain outwardly through said supply pipe until the level in the cylinder is even with the top thereof. Also extending upwardly into the interior of the cylinder 2 are a plurality of stand pipes 9, 10, 11 and 12, each of which is adapted to communicate with the interior of the cylinder at a different level. Said stand pipes are each provided with a valve 13 adapted to seat in an outwardly flared adjustable seat 13ª threaded on the upper end thereof, and said valves 13 are each provided with a push rod 14 extending upwardly through the stand pipe and guided by suitable guides 15 and 16 therein. At the points where the stand pipes 9, 10, 11 and 12 and the supply pipe 8 pass through the upper wall of the base casing 1, suitable packings 17 are ordinarily provided, although if desired, a pipe connection between the pipes and the casing may be attained by brazing, soldering, or other suitable means.

Extending transversely of the base casing 1 is an inclined delivery pipe 18 which is provided with a plurality of upwardly extending integral pipes 19, 20, 21, 22 and 23 which pipes 20, 21, 22 and 23 may be connected with the outer ends of the stand pipes 9, 10, 11 and 12 by means of unions 24, 25, 26, and 27 respectively. The pipe 19 connects with a pipe 28 which extends just through the top of the base casing 1 into the interior of the cylinder, and which is provided with a valve similar to the valve 13 and connected to the pipe 19 by means of a union 29. Each of the pipes 19 to 23 inclusive is provided with a boss 30 in which a shaft 31 is mounted, and said shafts 31 are each provided with a squared portion 32 which non-rotatably supports an arm 33 that is engaged between a portion 34 formed on the lower end of the valve push rod 14. The outer ends of the shafts 31 each extend outwardly through the base casing 1 and have a handle 35 secured thereto whereby they may be rotated to lift the valves 13 away from their seats 13ª in the tops of the pipes, and consequently allow fluid in the cylinder to flow outwardly therethrough.

Figure 7 illustrates a form of mechanism which is provided for operating the valves 13 from a point considerably below the cylinder 2. In this construction extensions 36 on the push rods 14 extend downwardly through the delivery pipe 18 and outwardly through stuffing boxes 37 thereon to suitable crank operating mechanisms 38 which are connected to the lower end thereof and adapted to be actuated by the operation to open the valves. In this construction the valves 13 may be closed by springs 39 engaged between the outer ends of the stuffing boxes 37 and collars 40 secured on the extensions 36. The length of said extensions may be adjusted by suitable turnbuckles 41.

After the valve seats have been adjusted to the proper height to deliver an accurately measured volume of fluid the cover 4 may be sealed by means of a seal 42 extending through an aperture in one of the rods 5 outside the nut thereon.

The operation is as follows:

The operation of the dispensing apparatus of this invention will be evident from the foregoing description. It is only necessary to fill the cylinder 2 with fluid from the supply pipe 8 until the fluid therein reaches a level somewhat above the top of the supply pipe, at which time the source of fluid supply is disconnected and the fluid allowed to flow out of the cylinder through the supply pipe 8 which then becomes an overflow pipe until the level in the cylinder is even with the top thereof. The heights of the stand pipes 9, 10, 11 and 12 are each calculated so that a predetermined volume of liquid may flow therethrough to the dispensing pipe 18 when the valve in the top thereof is open before the liquid reaches the level of the top thereof. Since the sizes of the cylinders 2 vary somewhat the proper height may be finally attained by adjusting the valve seats 13ª on the stand pipes. The amount of liquid delivered upon the opening of any of the valves is therefore accurately measured and does not depend upon the judgment or skill of the operator. After all the necessary adjustments are made the cover 4 may be sealed with the seal 42 by an inspector or other person in authority. The entire contents of the container may, of course, be distributed through the delivery pipe by opening the valve in the pipe 28.

In ascertaining the correct heights of the stand pipes it is, of course, necessary to allow for the volume occupied thereby, and since the tops of these stand pipes are normally closed, it is possible to compute these heights accurately.

The apparatus is easily operated, since in order to deliver a given volume, it is only necessary to open the proper valve, no further attention being required on the part of the operator until it is desired to again fill the cylinder when the valves 13 are all closed.

The provision of the transparent cylinder allows the purchaser of the fluid to see that he is given the proper measured amount, and since this amount is determined by rigid stand pipes of a predetermined height, there can be no question about the proper measure.

The sealing of the cover 4 effectually prevents access to all adjustable parts and consequently a measured volume which has been ascertained by an inspector or other person cannot be varied after such sealing is effected.

It will thus be apparent that this invention provides an accurate, easily operable dispensing apparatus which quickly delivers the proper quantity of fluid, and which may be conveniently adjusted and sealed after adjustment.

I am aware that numerous details of construction may be varied through a wide range without departing from the principles of this invention, and I therefore do not purpose limiting the patent granted otherwise than necessitated by the prior art.

I claim as my invention:

In a fluid dispenser, a fluid container, a plurality of stand pipes of different elevations in said container, a common delivery pipe connected to said stand pipes, a valve in the top of each stand pipe, operating mechanism for each valve including a horizontal shaft extending into each stand pipe and means for separately rotating each shaft for elevating said valves, said operating mechanism holding said valves in elevated position.

In testimony whereof I have hereunto subscribed my name in the presence of two subscribing witnesses.

AUSTIN L. WERTZ.

Witnesses:
CARLTON HILL,
OSCAR HARTMANN.